United States Patent
Xia et al.

[11] Patent Number: 6,014,466
[45] Date of Patent: Jan. 11, 2000

[54] OBJECT-BASED VIDEO CODING OF ARBITRARILY SHAPED OBJECTS USING LAPPED ORTHOGONAL TRANSFORMS (LOTS) DEFINED ON RECTANGULAR AND L-SHAPED REGIONS

[75] Inventors: Xiang-Gen Xia, Newark, Del.; Roy M. Matic, Newbury Park, Calif.

[73] Assignee: Hughes Electronics Corporation, El Segundo, Calif.

[21] Appl. No.: 08/891,083

[22] Filed: Jul. 10, 1997

[51] Int. Cl.[7] .............................. G06K 9/36; G06K 9/46; G06K 9/38

[52] U.S. Cl. ......................... 382/243; 382/239; 382/248; 382/251; 358/433; 348/405

[58] Field of Search ..................................... 382/239, 241, 382/243, 248, 251, 232, 242; 358/430, 432, 433, 261.2, 261.3; 348/420, 395, 405, 408

[56] References Cited

PUBLICATIONS

Jain et al., "Image Segmentation Using Clustering", Advances in Image Understanding: A Festschrift for Azriel Rosenfeld, IEEE Computer Society Press, 1996, pp. 65–83.

Chellappa et al., "Multiresolution GMRF Models for Image Segmentation", Advances in Image Understanding: A Festschrift for Azriel Rosenfeld, IEEE Computer Society Press, 1996, pp. 13–27.

*Primary Examiner*—Bipin Shalwala
*Attorney, Agent, or Firm*—V. D. Duraiswamy; M. W. Sales

[57] ABSTRACT

An object-based image/video coding algorithm that encodes arbitrary shaped objects using LOTs defined on rectangular and L-shaped regions. The regions of support of the blocks in the L-shaped regions are extended to form tapered overlapping regions that meet at the object's exterior and concave corners. The overlapping regions taper to the corners with a slope having a magnitude $\delta/\epsilon$, where $\delta$ and $\epsilon$ are the amounts of overlap between the blocks. This allows the basis and tapered window functions to be defined in the L-shaped region and specifically in the tapered overlapping regions in a manner that maintains the orthogonality of the basis functions while providing a smooth transition at the edges.

23 Claims, 8 Drawing Sheets

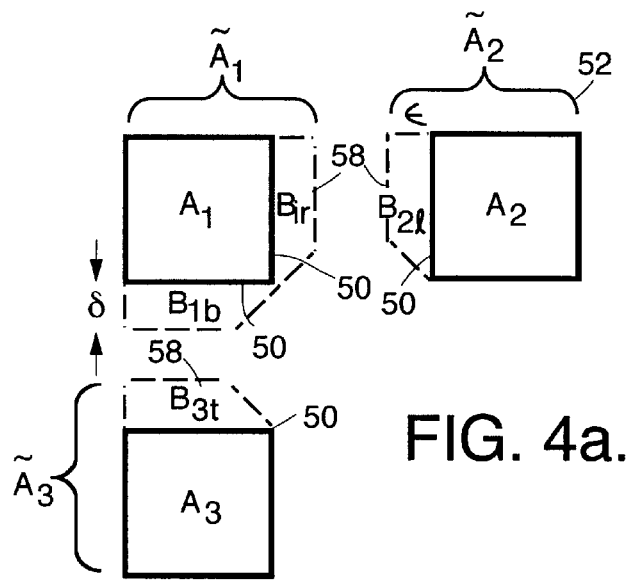
FIG. 4a.
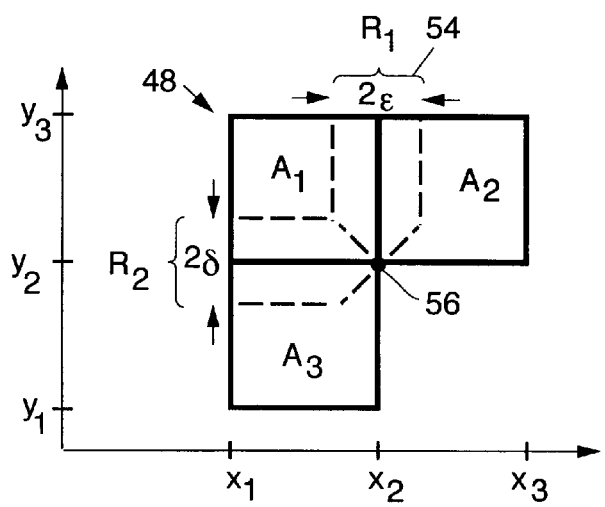
FIG. 4b.
FIG. 6.
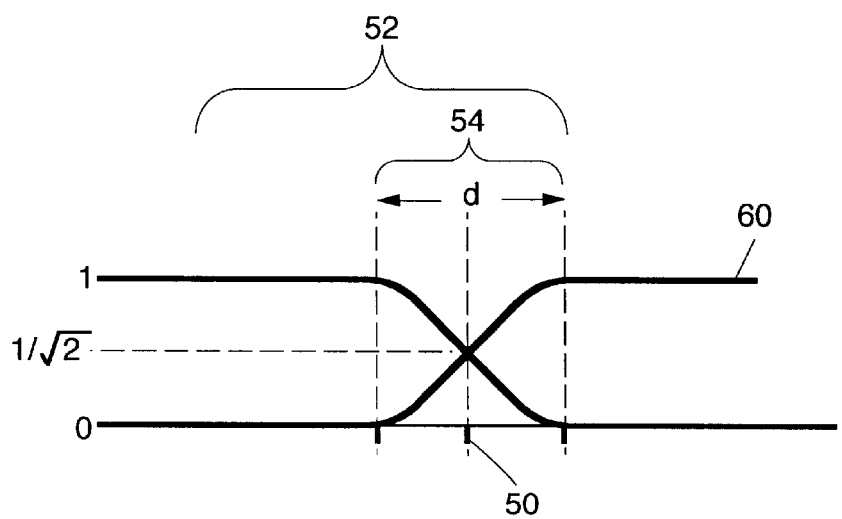

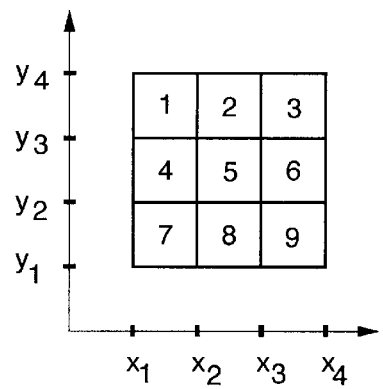
FIG. 10.
FIG. 12.
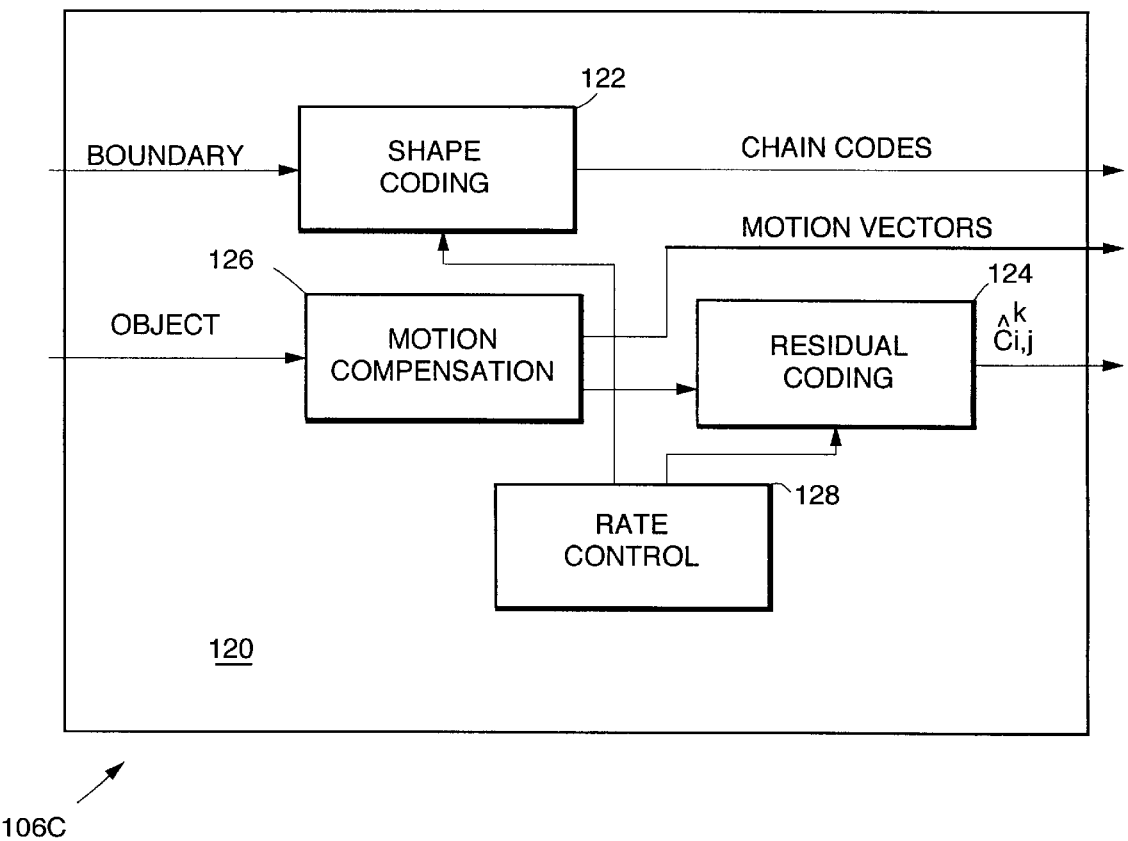

OBJECT-BASED VIDEO CODING OF ARBITRARILY SHAPED OBJECTS USING LAPPED ORTHOGONAL TRANSFORMS (LOTS) DEFINED ON RECTANGULAR AND L-SHAPED REGIONS

BACKGROUND OF THE INVENTION

1. Field of the Invention

This invention relates to object-based image/video coding using lapped orthogonal transforms (LOTs) and more specifically to using LOTs on arbitrarily shaped objects that are completely defined by rectangular and L-shaped regions.

2. Description of the Related Art

Current image/video coding standards such as JPEG, MPEG1 and MPEG2 use transforms such as the discrete cosine transform (DCT) to encode/decode digital imagery. Block transform based algorithms first subdivide the image into contiguous N×N blocks, typically 8×8 pixels, and then decorrelate each block by projecting it onto a set of orthogonal basis functions to create an N×N block of transform coefficients, which are quantized, entropy coded, and transmitted. The distortion in the reconstructed image is minimized for a given bit rate by allocating bits to the individual transform coefficients based upon their relative strengths. At moderate to high bit rates, the visual quality of the reconstructed image remains high because the quantization errors in the coefficients are distributed evenly throughout each transform block.

However, at low bit rates (high compression ratios), the coarse quantization of the transform coefficients produces artifacts between the blocks in the reconstructed image, which degrades image quality. The blocking effects are caused by the hard truncation of the blocks' basis functions, which produces discontinuities in their basis functions at their shared edges. The effect of the discontinuities is masked at higher bit rates.

As shown in FIG. 1, blocking effects are reduced by overlapping the transforms between adjacent blocks 10 in the image 12. This increases the number of encoding/decoding computations but does not increase the number of transform coefficients, and hence the bit rate is unaffected. The lapped orthogonal transform (LOT) is created by first extending each block's region of support 14 by amounts $\epsilon, \delta$ in the horizontal and/or vertical directions, depending upon whether the block is an interior, edge or corner block. The extension forms rectangular overlapping regions 16 about the blocks' shared interior edges 18. Next, each block's basis functions are extended over its extended region of support in a manner that maintains their orthogonality such as an odd/even extension. A window function is defined on the block's extended region of support that has a value of one inside the block excluding the rectangular overlapping regions, a value of zero outside the block's extended region of support, and tapers from one to zero across the overlapping region, typically along a sinusoidal curve. To maintain orthogonality, the adjacent blocks' overlapping window functions are symmetric about their shared edges and preserve the energy of the LOT in the overlapping regions, i.e. the sum of the squares of the window functions equals one. The lapped orthogonal basis functions for the forward LOT are the product of the extended basis functions and their tapered window functions.

The forward LOT weights the lapped orthogonal basis functions by the pixel intensity values and integrates them over the block's extended region of support. Because the forward LOTs extend into adjacent blocks, the information that contains the intensity values for pixels in a block is distributed among the transform coefficients for that block and the adjacent blocks whose regions of support extend into the given block. Consequently, to reconstruct the block, the inverse LOT requires the transform coefficients from each of these blocks. Dropping any of the transform coefficients may introduce artifacts into the reconstructed image.

The emerging MPEG4 video coding standard supports object-based coding, which is particularly useful in video phony, teleconferencing, and news broadcasting applications. Object-based coding increases SNR performance and provides the flexibility to only encode/decode, enhance, scale, or zoom specific objects. If blocked transforms are used, each image frame 12 is subdivided into N×N blocks 10 as shown in FIG. 2 and segmented into a plurality of arbitrarily shaped objects 20 defined on the N×N grid. The objects include boundaries 22, the object blocks 24 inside the boundary, and the motion vectors that describe their interframe motion. This approach improves compression and reduces visual artifacts in the reconstructed background, but suffers from blocking effects at low bit rates.

The known LOT defined on rectangular regions can not be used to encode the arbitrarily shaped object 20 without either A) block coding edges in L-shaped regions of the object thereby incurring blocking artifacts along those edges, B) discarding some transform coefficients associated with non-object blocks 26 outside the boundary 22 that contribute to the reconstruction of pixels inside the object in order to maintain the bit rate thereby introducing edge artifacts into the reconstructed image, or C) retaining those transform coefficients to reconstruct the image thereby effectively double coding those non-object blocks and increasing the total bit rate. The problem occurs where the object 20 has an exterior and concave corner 28. The standard rectangular extension from the pair of interior edges 30 that meet at corner 28 would define an overlapping region that lies partly outside the object's boundary. Option A avoids the problem by block coding the edges 30 in the L-shaped region 32 around the corner 28, option B discards a portion of the transform coefficients needed to reconstruct the object, and option C retains the coefficients at the cost of an increased bit rate.

Therefore, when LOTs are used, the objects 20 are masked using a rectangular mask 33 that completely covers the object 20. This approach reduces blocking effects at all of the edges 18,30 inside the object 20 but wastes bits coding non-object blocks 26 inside the mask 33 at higher bit rates than they would be encoded as part of the background and may produce artifacts between the non-object blocks on opposite sides of the mask's boundary 22.

SUMMARY OF THE INVENTION

In view of the above problems, the present invention provides an object-based image/video coding algorithm for encoding arbitrary shaped objects with LOTs.

This is accomplished by extending the regions of support of the blocks in the L-shaped regions to form tapered overlapping regions that meet at the object's exterior and concave corner. The overlapping regions taper to the corners with a slope having a magnitude $\delta/\epsilon$, where $\delta$ and $\epsilon$ are the amounts of overlap between the blocks in the vertical and horizontal directions. Basis functions and tapered window functions are defined in the L-shaped region and specifically in the tapered overlapping regions in a manner that maintains the orthogonality of the basis functions while providing a smooth transition at the edges. By combining the known LOTs defined on the rectangular regions with Applicant's LOTs defined on the L-shaped regions, the blocking effects are reduced over the entire object without wasting bits on non-object blocks.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 4a and 4b respectively illustrate the extended regions of support for blocks in an L-shaped region and the overlapping regions formed between adjacent blocks in accordance with the present invention;

FIG. 6 is a plot of the tapered window functions in the overlapping regions of the rectangular and tapered regions shown in FIG. 5;

FIG. 10 illustrates the Cartesian coordinate system on which the different window functions are defined;

FIG. 12 is a block diagram of one of the encoding blocks shown in FIG. 11.

DETAILED DESCRIPTION OF THE INVENTION

The present invention provides an object-based image/video coding algorithm for coding arbitrarily shaped objects using lapped orthogonal transforms without block coding portions of the object, discarding transform coefficients required to reconstruct the object, double coding portions of the image, or masking the object with a rectangular window. In the L-shaped regions around the object's exterior and concave corners, the blocks' regions of support are extended to form tapered overlapping regions about their interior edges that meet at the corners. The overlapping regions taper to the corners with a slope having a magnitude $\delta/\epsilon$, where $\delta$ and $\epsilon$ are the amounts of overlap between the blocks in the vertical and horizontal directions, and thus do not extend outside the object. Basis functions and tapered window functions are defined in the L-shaped region and specifically in the tapered overlapping regions in a manner that maintains the orthogonality of the basis functions while providing a smooth transition at the edges. By combining the known LOTs defined on the rectangular regions with Applicant's LOTs defined on the L-shaped regions, the blocking effects can be reduced over the entire object without wasting bits on non-object blocks.

Figure 1:
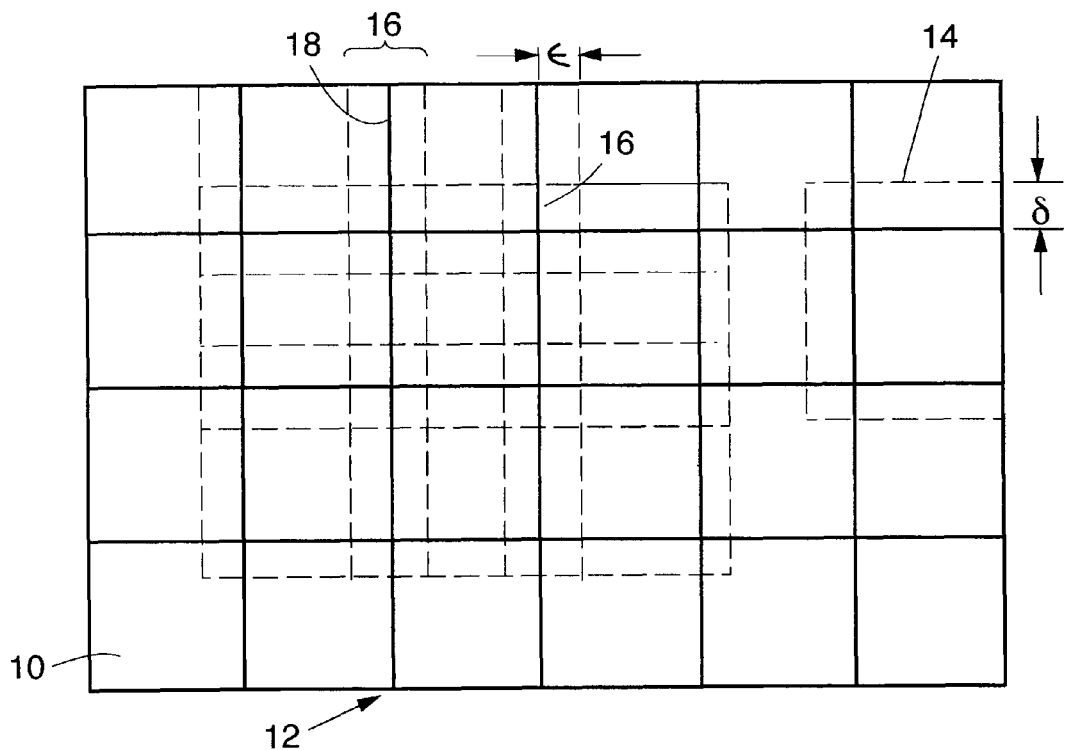
FIG. 1, as described above, illustrates a known LOT on a rectangular region.
Figure 2:
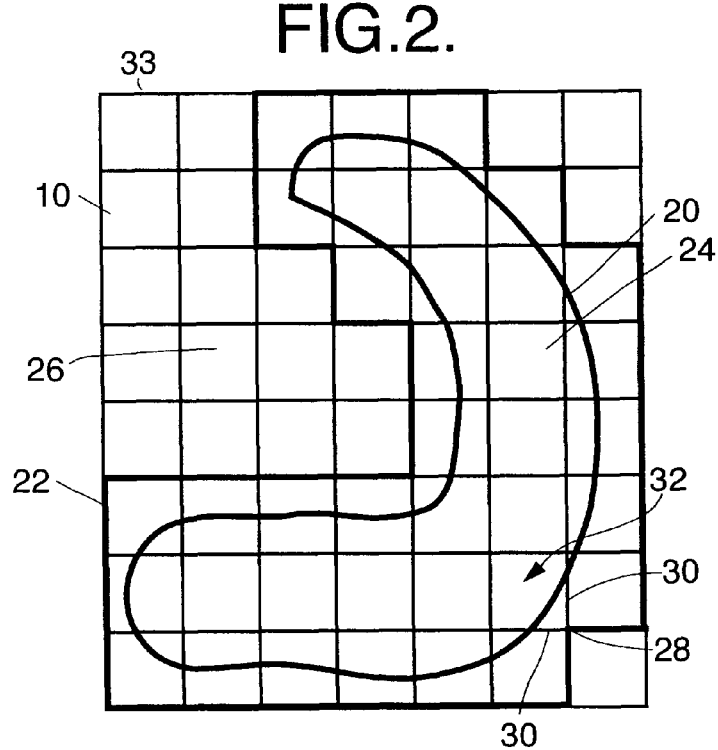
FIG. 2, as described above, illustrates the use of the known LOT shown in FIG. 1 in object-based video coding.
Figure 3:
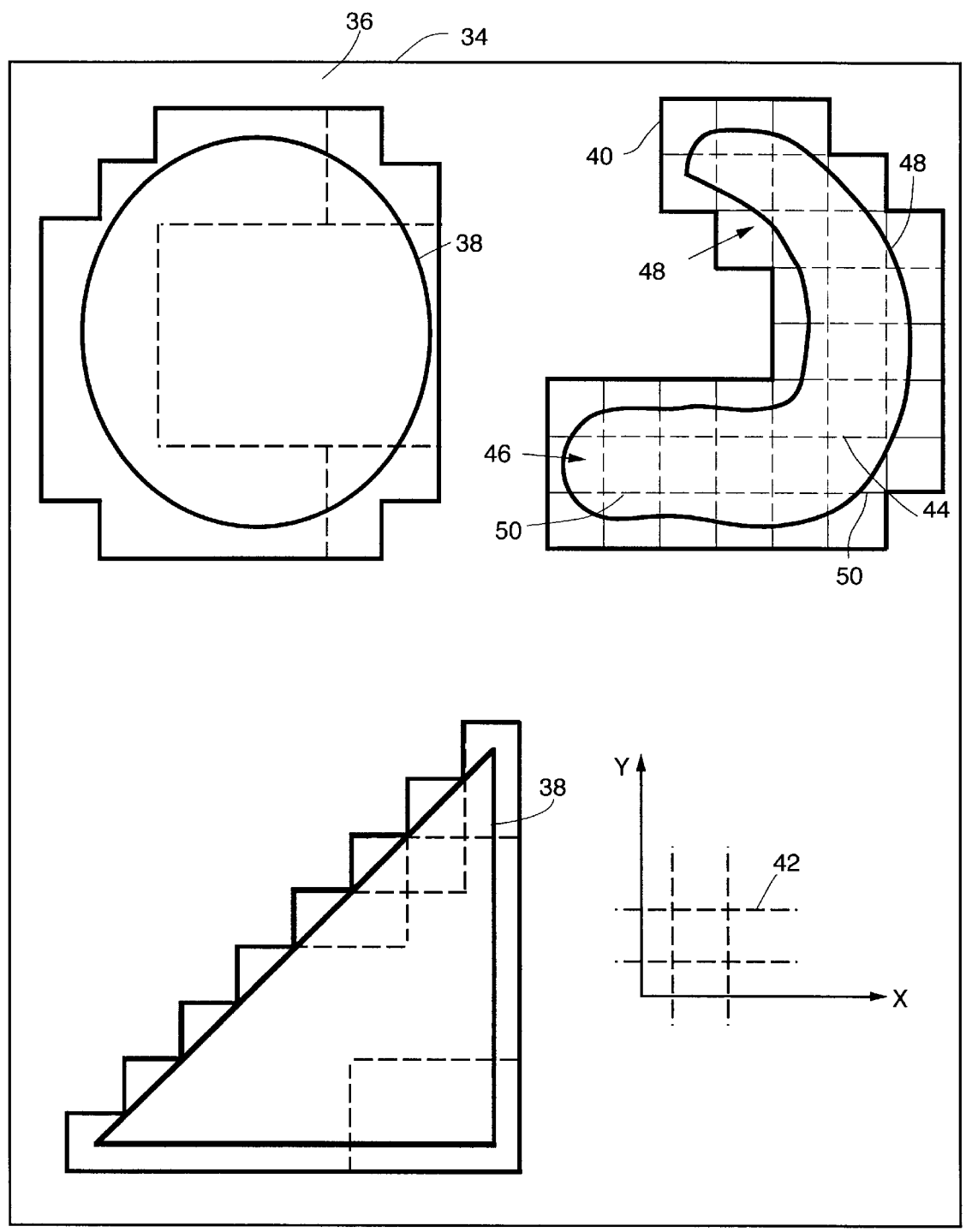
FIG. 3 illustrates a plurality of segmented objects that are completely defined by rectangular and L-shaped regions.

As shown in FIG. 3, the first step in the image/video coding process is to subdivide an image 34 into N×N blocks 36 and segment the image into its constituent objects 38. Segmentation algorithms such as Jain et al. "Image Segmentation Using Clustering", *Advances in Image Understanding: A Festschrift for Azriel Rosenfeld,* IEEE Computer Society Press, 1996. pp. 65–83 and Chellappa, "Multiresolution GMRF Models for Image Segmentation", *Advances in Image Understanding: A Festschrift for Azriel Rosenfeld,* IEEE Computer Society Press, 1996, pp. 13–27 are well known in the field of image/video coding. Each object 38 is defined by its boundary 40 on the x-y coordinate grid 42 and a plurality of object blocks 44, and can be completely described by a combination of rectangular regions 46 (dashed lines) and L-shaped regions 48 (dotted lines). The interior edges 50 inside the rectangular regions 46 and between the rectangular and L-shaped regions are encoded using LOTs defined on rectangular overlapping regions and the interior edges 50 inside the L-shaped regions are encoded using LOTs defined on Applicant's tapered overlapping regions.

FIGS. 4a and 4b respectively illustrate the extended regions of support 52 and tapered overlapping regions 54 for object blocks in an L-shaped region 48, which is shown and described with a particular orientation without loss of generality. Each L-shaped region 48 includes first, second and third blocks that have respective regions of support $A_1(x,y)$, $A_2(x,y)$ and $A_3(x,y)$. The first and second blocks and the first and third blocks respectively share first and second interior edges 50 that meet at the object's exterior and concave corner 56. The blocks' regions of support are extended $(B_{1r}(x,y), B_{1b}(x,y), B_{2l}(x,y), B_{3t}(x,y))$ to form respective extended regions of support 52 $(\tilde{A}_1(x,y), \tilde{A}_2(x,y), \tilde{A}_3(x,y))$ that overlap in first and second overlapping regions 54 $(R_1(x,y), R_2(x,y))$. The overlapping regions 54 are symmetrical about the first and second interior edges and taper between respective pairs of extension edges 58 to the corner 56 with a slope having magnitude $\delta/\epsilon$. $\epsilon$ and $\delta$ are, respectively, the amounts of overlap between the blocks in the x and y directions and have non-zero values. An overlap between 25% and 75% of the block size provides sufficient smoothing, with 50% being a typical value.

Specifically, the extension regions are defined as follows:

$$B_{1r}(x, y) = \left\{ (x, y) : x_2 \le x \le x_2 + \varepsilon, y \ge \frac{\delta}{\varepsilon}(x - x_2) + y_2 \right\} \quad (1)$$

$$B_{1b}(x, y) = \left\{ (x, y) : y_2 - \delta \le y \le y_2, x \le \frac{\varepsilon}{\delta}(y - y_2) + x_2 \right\} \quad (2)$$

$$B_{2l}(x, y) = \left\{ (x, y) : x_2 - \varepsilon \le x \le x_2, y \ge \frac{-\delta}{\varepsilon}(x - x_2) + y_2 \right\} \quad (3)$$

$$B_{3t}(x, y) = \left\{ (x, y) : y_2 \le y \le y_2 + \delta, x \le \frac{-\varepsilon}{\delta}(y - y_2) + x_2 \right\}, \quad (4)$$

where the number in the subscript refers to the block number that the extension region belongs to and the letter in the subscript refers to the edge of that block. For example $B_{2l}(x,y)$ is the extension region for Block 2, left edge.

Each block's extended region of support 52 is the union of its region of support with its extension regions, and is defined as follows:

$$\tilde{A}_1(x,y) = A_1(x,y) \cup B_{1r}(x,y) \cup B_{1b}(x,y) \quad (5)$$

$$\tilde{A}_2(x,y) = A_2(x,y) \cup B_{2l}(x,y) \quad (6)$$

$$\tilde{A}_3(x,y) = A_3(x,y) \cup B_{3t}(x,y). \quad (7)$$

The overlapping regions 54 are formed by taking the intersection of the blocks' extended regions of support as follows:

$$R_1(x,y) = \tilde{A}_1(x,y) \cap \tilde{A}_2(x,y) \quad (8)$$

$$R_2(x,y) = \tilde{A}_1(x,y) \cap \tilde{A}_3(x,y) \quad (9)$$

Figure 5:
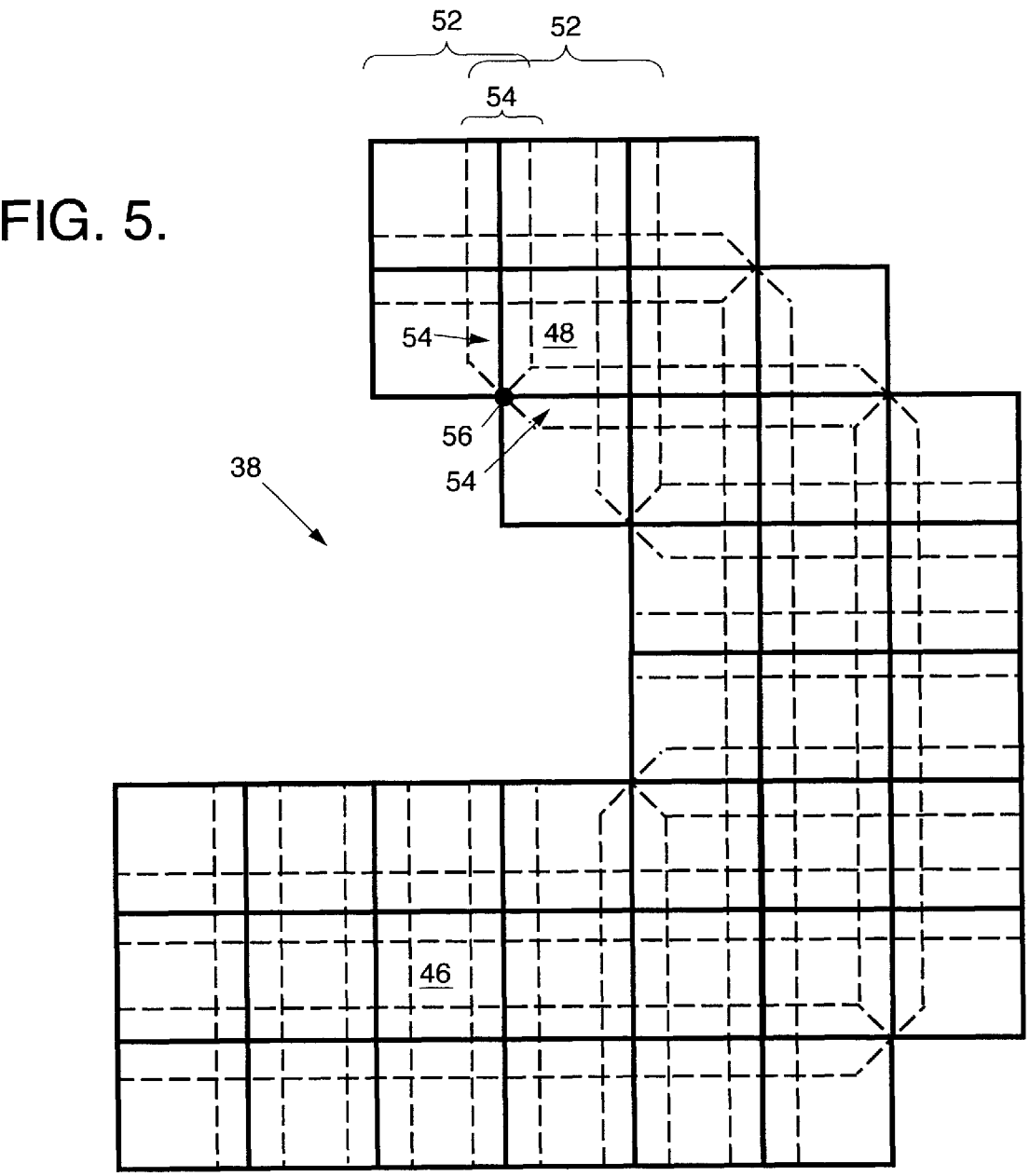
FIG. 5 illustrates the rectangular and tapered regions of support for one of the objects shown in FIG. 3.

FIG. 5 illustrates the extended regions of support 52 and overlapping regions 54 for one of the objects 38 shown in FIG. 3. The rectangular regions 46 formed inside, along an edge or at a convex corner of the object include rectangular overlapping regions. The L-shaped regions 48 formed at the corner 56 of the object each include a pair of tapered overlapping regions 54 that meet at the corner. As a result, a complete set of orthogonal basis functions can be defined for each block without extending them past the object's boundary.

Each block's basis functions $f_{i,j}(x,y)$ are extended over its extended region of support in a manner that preserves the orthogonality of the basis and does not produce a large discontinuity at the edges. For example, an odd/even extension is defined as follows:

$$\tilde{f}_{i,j}(x,y) = \begin{cases} f_{i,j}(x,y) & (x,y) \in A_k \quad \text{(in the block)} \\ -f_{i,j}(2x_k - x, y) & (x,y) \in B_l(x,y) \quad \text{left (odd) extension} \\ f_{i,j}(2x_{k+1} - x, y) & (x,y) \in B_r(x,y) \quad \text{right (even) extension} \\ -f_{i,j}(x, 2y_k - y) & (x,y) \in B_b(x,y) \quad \text{bottom (odd) extension} \\ f_{i,j}(x, 2y_{k+1} - y) & (x,y) \in B_t(x,y) \quad \text{top (even) extension} \\ 0 & \text{elsewhere,} \end{cases} \quad (10)$$

where $f_{i,j}(x,y)$ is the extended basis functions, $(x_k, y_k)$, $(x_{k+1}, y_k)$, $(x_k, y_{k+1})$ and $(x_{k+1}, y_{k+1})$ are the corner points of the block $A_k$ and $B_l(x,y), B_r(x,y), B_b(x,y)$ and $B_t(x,y)$ are the extension regions, which can either be the tapered regions described in equations 1–4, rectangular regions, or the empty set.

The basis functions $u_{i,j}(x,y)$ for the LOT are the product of the block's extended basis functions $\tilde{f}_{i,j}(x,y)$ and its window function $W(x,y)$.

$$u_{i,j}(x,y) = \tilde{f}_{i,j}(x,y) W(x,y) \quad (11)$$

As shown in FIG. 6, the window functions 60 weight the basis functions $\tilde{f}_{i,j}(x,y)$ so that they taper to zero across the overlapping regions 54. The width d of the overlapping region is either a constant $2\delta$ or $2\epsilon$ in rectangular overlapping regions or a maximum of $2\delta$ or $2\epsilon$ in L-shaped overlapping regions tapering to d=0 at the corner. As a result, when the object is reconstructed the edges 50 are smooth and do not exhibit noticeable blocking effects.

The window function 60 shown in FIG. 6 follows a sinusoidal curve, which is the currently preferred window. However, many different sets of window functions may be used to construct the basis functions for the LOT as long as they satisfy a set of boundary and orthogonality conditions. In general, the window functions must have a value of 1 inside each block excluding the overlapping regions that extend into the block, a value of zero outside the block's extended region of support, and taper from 1 to zero across the overlapping regions. Furthermore, the window functions from adjacent blocks that overlap at an edge must be symmetric with each other about that edge and preserve the energy of the LOT's basis functions in the overlapping region.

Specifically, the conditions on the window functions in the L-shaped regions are given as follows:

1. Boundary Conditions $$W_1(x,y) = 1 \text{ for } (x,y) \in A_1 \text{ but } (x,y) \notin B_{2l}(x,y) \cup B_{3l}(x,y)$$

$$W_2(x,y) = 1 \text{ for } (x,y) \in A_2 \text{ but } (x,y) \notin B_{1r}(x,y) \quad (12)$$

$$W_3(x,y) = 1 \text{ for } (x,y) \in A_3 \text{ but } (x,y) \notin B_{1t}$$

$$W_j(x,y) = 0 \text{ for } (x,y) \notin \tilde{A}_j(x,y), \; j=1,2,3. \quad (13)$$

2. Orthogonality Conditions

A. Symmetry Condition $$W_2(x,y) = W_1(-x,y) \text{ for } (x,y) \in B_{1r}(x,y) \cup B_{2l}(x,y) \quad (14)$$

$$W_3(x,y) = W_1(x,-y) \text{ for } (x,y) \in B_{1b}(x,y) \cup B_{2l}(x,y)$$

B. Energy Preservation Condition $$W_1^2(x,y) + W_2^2(w,y) = 1 \text{ for } (x,y) \in B_{1r}(x,y) \cup B_{2l}(x,y) \quad (15)$$

$$W_1^2(x,y) + W_3^2(w,y) = 1 \text{ for } (x,y) \in B_{1b}(x,y) \cup B_{3l}(x,y)$$

With reference to FIG. 4b, there is an apparent discontinuity at the corner point $(x_2, y_2)$ due to conflicting requirements of the window functions. In the transition regions interior to block $A_1$, $B_{2l}$ and $B_{3l}$, along the line with slope $-\delta/\epsilon$ that goes through $(x_2, y_2)$, the value of the window function is defined to be 1. In the extension regions, $B_{1b}$ and $b_{1r}$, along the line with slope $\delta/\epsilon$ that also includes $(x_2, y_2)$, the value of the window function is defined to be 0. There is an apparent conflict because the window function has two different values, 0 and 1, at the corner point. Furthermore, since all three window functions overlap at the corner the energy preservation condition changes.

However, a discontinuity at a single point is of no consequence in theory or in practice. A finite discontinuity at a single point has no effect on the value at the transform coefficient because the integral over a finite value, single point discontinuity is zero. As a result, the corner point can be assigned any finite value. However, to be consistent with the energy preservation conditions in the rest of the overlap regions, the window functions of the corner point are preferably assigned values between 0 and 1 such that the sum of the squares of all three window functions is equal to one. For example, the values could each be set equal to $1/\sqrt{3}$.

In reality, the corner point problem completely disappears in any practical, realizable implementation of this scheme because as soon as one properly discretizes the problem (which must be done to numerically perform the L-shaped LOT on a computer), the corner point "disappears". The reason for this is that to properly implement this scheme so that the even/odd symmetric extensions of the basis functions are correct, the block boundaries must be chosen so that they occur exactly in the center between the sample points of the adjacent blocks. With the proper selection of the block boundary, the corner point is not a sample point and there is never a situation where the window functions of all three blocks intersect at any sample locations. When there is an intersection it is between two out of three of the window functions.

Figure 7:
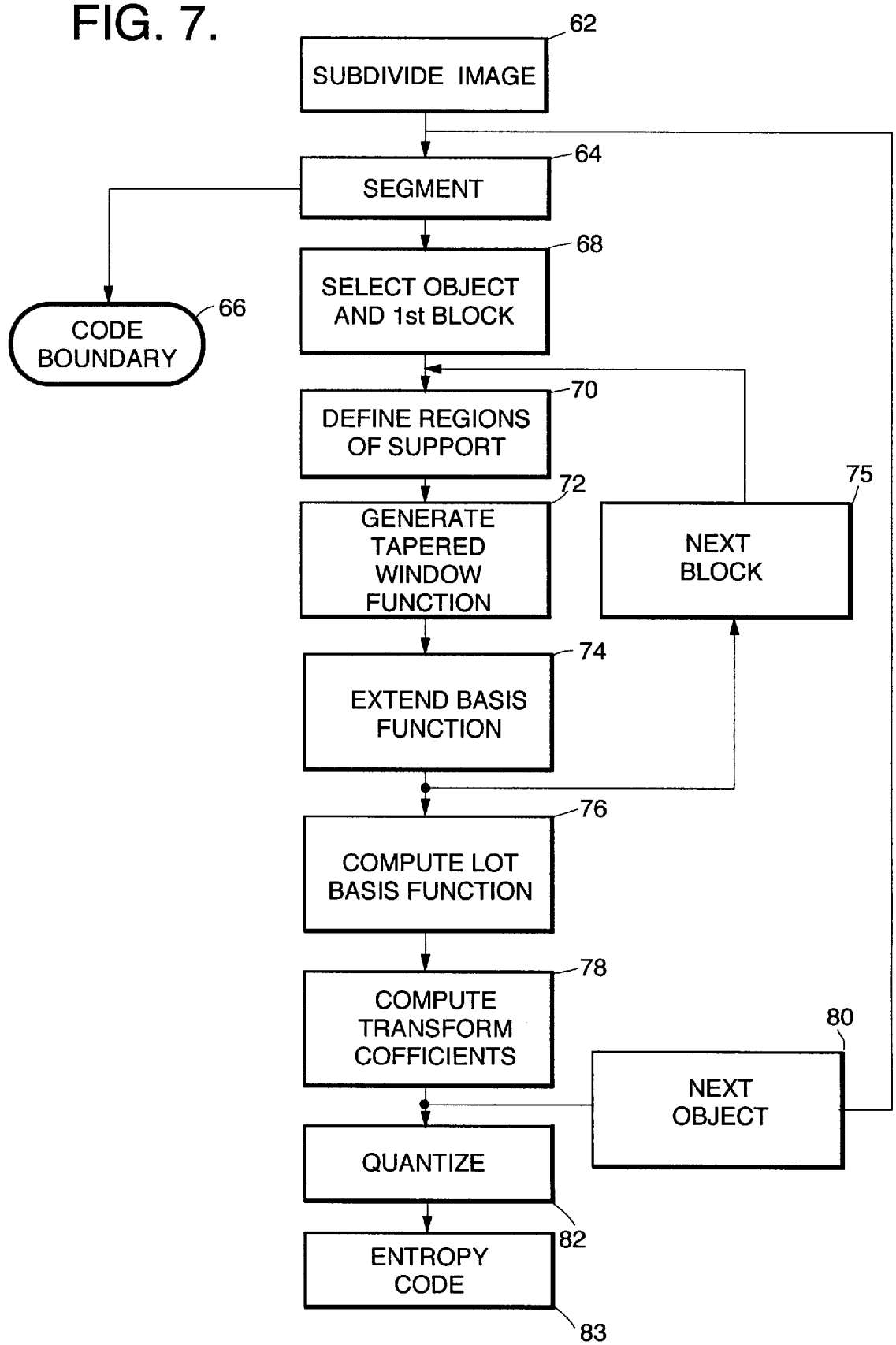
FIG. 7 is a flow chart of an object-based image coding algorithm using LOTs on rectangular and L-shaped regions.

FIG. 7 is a flow chart of an object-based image/video encoding algorithm that uses LOTs on both rectangular and L-shaped regions. The image or each image frame of a video signal is subdivided into N×N blocks (step 62) and segmented into its constituent objects (step 64) with their respective basis functions. The objects' boundaries are coded (step 66) using chain codes, for example. Once segmented, one of the objects and its first block are selected (step 68). The block's extended regions of support (step 70) and window functions (step 72) are defined. This can be done for the entire block at once, as described in FIG. 8, or can be done an edge at a time, as described in FIG. 9. The shape of the extended regions and the window functions will depend upon whether the block is an interior, edge, or corner block in a rectangular region or a block in an L-shaped region as detailed above. The block's basis functions are then extended to cover its extended region of support (step 74). Thereafter, the algorithm moves to the next block (step 75) and repeats steps 70–74. The LOT basis functions $u_{i,j}(x,y)$ for each block are then computed according to equation 11 (step 76).

A forward two-dimensional transform such as the LOT/DCT is performed on each block $I^k(x,y)$ of the image data $I(x,y)$ using its LOT basis functions $u^k_{i,j}(x,y)$ and its extended region of support $\tilde{A}_k(x,y)$ (step 78). The forward transform weights the orthogonal basis functions by the pixel intensity values and integrates them over the extended region of support to produce transform coefficients $C^k_{i,j}$ as given by:

$$C^k_{i,j} = \sum_{(x,y) \in \tilde{A}_k} \sum I^k(x,y) u_{i,j}(x,y) \qquad (16)$$

where k is the block number and i,j are the indices of the basis functions, which range from 0 to N-1. The algorithm selects the next object (step 80) and repeats steps (68–78). Once the entire image or selected objects in the image are encoded, the transform coefficients and boundary codes are quantized (step 82), entropy coded (step 83) and typically either transmitted to a remote site where the are downloaded and decoded using a complementary inverse transform to reconstruct the image/video or they are stored in a compressed form for subsequent retrieval. The decoder can completely reconstruct the individual blocks, objects and the entire image from the boundary codes and transform coefficients. It is not necessary to transmit the extended regions of support, window functions or basis functions because all of this information can be uniquely derived from the shape of the object's boundary.

Because the forward transforms overlap into adjacent blocks, the information that contains the intensity values for pixels in a given block is distributed among the transform coefficients for that block and the adjacent blocks whose regions of support extend into the given block. Applicant's construction of the extended regions of support in the L-shaped regions ensures that the given block will only extend into other blocks inside the object and that non-object blocks will not extend into the given block. Consequently, a given L-shaped block and the entire image can be reconstructed without dropping coefficients to maintain the desired compression ratio or reducing the compression ratio to avoid introducing artifacts into the L-shaped regions of the reconstructed image.

The inverse transform used to reconstruct the $k^{th}$ image block $I^k(x,y)$ is given by:

$$I^k(x,y) = \sum_{l \in N_k} \sum_{i=0}^{N-1} \sum_{j=0}^{N-1} \hat{C}^l_{i,j} \hat{u}^l_{i,j}(x,y) \quad (x,y) \in A^k \qquad (17)$$

where $N_k$ is a set of indices for the kth block and its contributing neighbors, $\hat{C}^l_{i,j}$ are the quantized transform coefficients for the blocks in $N_k$, $\hat{u}^l_{i,j}(x,y)$ are their inverse lapped orthogonal basis functions, which are typically identical to those for the forward transform except for a scaling factor, and $A_k(x,y)$ is the block's N×N region of support. An entire object is reconstructed by appending each of its reconstructed blocks. Similarly, the image is reconstructed by appending each of its reconstructed objects.

For each pixel in a block, the inverse transform integrates the basis functions weighted by the quantized transform coefficients for each of the contributing blocks and sums them together. The basis functions for the $k^{th}$ block are defined over the entire block, and hence contribute to the intensity values of all of the pixels in the block. The basis functions of each neighboring block are only non-zero in the overlapping region they share with the $k^{th}$ block. As a result, the neighboring blocks only contribute to the pixel intensities values in their overlapping regions.

Figure 8:
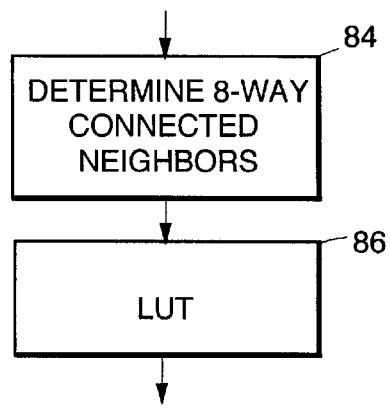
FIG. 8 is a flow chart illustrating the steps in FIG. 7 of defining the block's region of support and tapered window functions based upon the 8-way connectivity of the block.

The definition of a block's extended region of support (step 70) and the generation of its window functions (step 72) is preferably accomplished using a look-up table (LUT) that contains the different permutations of regions of support and window functions that can occur for a block and that is addressed based upon the shape of the object around the block. As shown in FIG. 8, one approach is to determine which of the block's eight-connected neighbors are part of the object (step 84). Each of the possible 8-way connected patterns is assigned a label that is used to address a LUT (step 86), which contains regions of support and window functions for each pattern. The advantage of this approach is that the block's entire extended region of support and window functions are determined in one step. However, the number of permutations of an 8-way connected pattern is very large, and thus programming the LUT would be very time consuming and require a lot of memory.

Figure 9:
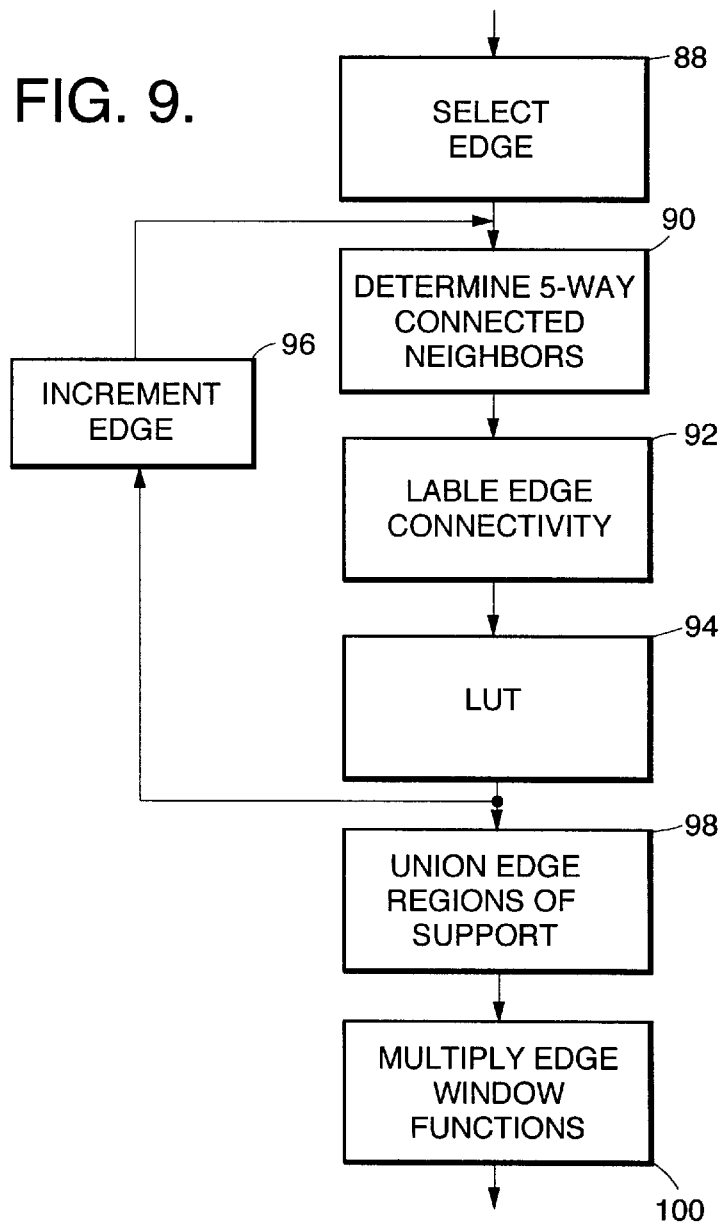
FIG. 9 is a flow chart illustrating the steps in FIG. 7 of defining the block's region or support and tapered window functions based upon the 5-way connectivity of each edge of the block.

As shown in FIG. 9, the preferred approach is to determine the region of support and window functions for each of the block's four edges and then combine them. Each edge has only five potentially connected neighbors and the resulting patterns can be readily classified into one of five classes. This greatly reduces the complexity and memory requirements of the LUT.

Specifically, the algorithm selects an edge (step 88), determines which of its five neighboring blocks are part of the object (step 90), labels the edge's connectivity as 1) no adjacent block, 2) rectangular extension, 3) upper L-shaped extension, 4) lower L-shaped extension, or 5) lower and upper L-shaped extension (step 92), and uses the label to access the LUT (step 94). The algorithm repeats (step 96) for each of the block's four edges.

With reference to FIG. 10, the five different cases for the left edge of block A are as follows:

1. No left neighbor. The window function can be described as $$W_l(x, y) = \begin{cases} 0 & x_1 \leq x \leq x_2 \\ 1 & \text{elsewhere,} \end{cases} \quad (18)$$

and the extension region $B_l(x,y) = \{\Phi\}$ is the empty set since, there is no overlapping into a region that does not exist.

2. Rectangular LOT left extension. This case occurs when the left neighbor exists and one of the following conditions is true: Both top and top-left neighbors exist but neither bottom nor bottom-left neighbors exist, both bottom and bottom-left neighbors exist but neither the top nor top-left neighbors exist, both pairs of neighbors exist—top, top-left and bottom, bottom-left, or neither pairs of neighbors exist (so that only the left neighbor exists). The conditions described above on the existence of pairs of top and bottom neighbors ensures that the rectangular LOT extension can be used. In this case the window function is:

$$W_l(x, y) = \begin{cases} 0 & x < x_2 - \varepsilon \\ 1 & x > x_2 + \varepsilon \\ \sin\left[\frac{\pi}{4\varepsilon}(x - x_2 + \varepsilon)\right] & |x - x_2| \leq \varepsilon, \end{cases} \quad (19)$$

and the extension region $B_l(x,y) = \{(x,y) : x_2 - \epsilon \leq x \leq x_2\}$.

3. L-shaped extension into top or top-left neighbor. In this case, the left neighbor exists and either the top neighbor or the top-left neighbor exists but not both. The bottom pair of neighbors either both exist or both do not exist. This case occurs when an L-shaped extension is required for one of the top neighbors, but not for the bottom ones.

In this case the window function is:

$$W_l(x, y) = \begin{cases} 0 & x < x_2 - \varepsilon \text{ and} \\ & x_2 - \varepsilon \leq x \leq x_2, \frac{\delta}{\varepsilon}(x - x_2) + y_3 < y \\ 1 & x > x_2 + \varepsilon \text{ and} \\ & x_2 \leq x \leq x_2 + \varepsilon, \frac{-\delta}{\varepsilon}(x - x_2) + y_3 < y \\ \sin\left[\frac{\pi}{4\varepsilon}(x - x_2 + \varepsilon)\right] & |x - x_2| \leq \varepsilon, y < y_3 - \delta \\ \sin\left[\frac{\pi\delta}{4\varepsilon(y_3 - y)}\left(x - x_2 + \frac{(y_3 - y)\varepsilon}{\delta}\right)\right] & |x - x_2| \leq \frac{(y_3 - y)\varepsilon}{\delta}, y_3 - \delta \leq y \leq y_3, \\ 0 \leq r \leq 1 & x = x_2, y = y_3 \end{cases} \quad (20)$$

where r is a value between 0 and 1 that is used to define the value of the corner point, subject to the energy preserving conditions discussed on page 11, line 24—page 12, line 4, and the extension region is $$B_l(x, y) = \left\{(x, y) : x_2 - \varepsilon \leq x \leq x_2, y \leq \frac{\delta}{\varepsilon}(x - x_2) + y_3\right\}.$$

4. L-shaped extension into bottom or bottom-left neighbor. In this case, the left neighbor exists and either the bottom neighbor or the bottom-left neighbor exists but not both. The top pair of neighbors either both exist or both do not exist. This case occurs when an L-shaped extension is required for one of the bottom neighbors, but not for the top ones. In this case the window function is:

$$W_l(x, y) = \begin{cases} 0 & x < x_2 - \varepsilon \text{ and} \\ & x_2 - \varepsilon \leq x \leq x_2, \frac{-\delta}{\varepsilon}(x - x_2) + y_2 > y \\ 1 & x > x_2 + \varepsilon \text{ and} \\ & x_2 \leq x \leq x_2 + \varepsilon, \frac{\delta}{\varepsilon}(x - x_2) + y_2 > y \\ \sin\left[\frac{\pi}{4\varepsilon}(x - x_2 + \varepsilon)\right] & |x - x_2| \leq \varepsilon, y > y_2 + \delta \\ \sin\left[\frac{\pi\delta}{4\varepsilon(y - y_2)}\left(x - x_2 + \frac{(y - y_2)\varepsilon}{\delta}\right)\right] & |x - x_2| \leq \frac{(y - y_2)\varepsilon}{\delta}, y_2 \leq y \leq y_2 + \delta, \\ 0 \leq r \leq 1 & x = x_2, y = y_2 \end{cases} \quad (21)$$

and the extension region $$B_l(x, y) = \left\{(x, y) : x_2 - \varepsilon \leq x \leq x_2, y \leq \frac{\delta}{\varepsilon}(x - x_2) + y_3\right\}.$$

5. Two L-shaped extensions, one into top or top-left neighbor and one into bottom or bottom-left neighbor. In this case the left neighbor, either the top or top-left neighbor exists (but not both), and either the bottom or bottom-left neighbor exists (but not both). In this case the window function is:

$$W_l(w,y) = \begin{cases} 0 & x < x_2 - \varepsilon \\ & x_2 - \varepsilon \leq x \leq x_2, \left\{\dfrac{-\delta}{\varepsilon}(x-x_2)+y_2 > y, \text{ and} \right. \\ & \left. \dfrac{\delta}{\varepsilon}(x-x_2)+y_3 < y\right\} \\ & x > x_2 + \varepsilon, \\ 1 & x_2 \leq x \leq x_2 + \varepsilon, \left\{\dfrac{\delta}{\varepsilon}(x-x_2)+y_2 > y, \text{ and}\right. \\ & \left. \dfrac{-\delta}{\varepsilon}(x-x_2)+y_3 < y\right\} \\ \sin\left[\dfrac{\pi}{4\varepsilon}(x-x_2+\varepsilon)\right] & |x-x_2| \leq \varepsilon,\, y_2 + \delta < y < y_3 - \delta \\ \sin\left[\dfrac{\pi\delta}{4\varepsilon(y-y_2)}\left(x-x_2+\dfrac{(y-y_2)\varepsilon}{\delta}\right)\right] & |x-x_2| \leq \dfrac{(y-y_2)\varepsilon}{\delta},\, y_2 \leq y \leq y_2 + \delta \\ \sin\left[\dfrac{\pi\delta}{4\varepsilon(y_3-y)}\left(x-x_2+\dfrac{(y_3-y)\varepsilon}{\delta}\right)\right] & |x-x_2| \leq \dfrac{(y_3-y)\varepsilon}{\delta},\, y_3 - \delta \leq y \leq y_3, \\ 0 \leq r \leq 1 & x = y_2,\, y = y_3 \text{ or } y_2 \end{cases} \quad (22)$$

and the extension region $$B_l(x,y) = \left\{(x,y): x_2 - \varepsilon \leq x \leq x_2,\, \dfrac{-\delta}{\varepsilon}(x-x_2)+y_2 \leq y \leq \dfrac{\delta}{\varepsilon}(x-x_2)+y_3\right\}. \quad (25)$$

The five different cases for the right edge are symmetric with the left edge representations, i.e. the sine functions used to define the window functions for the left edge are replaced with cosine functions. This is done to preserve energy in the overlapping regions and maintain the orthogonality of the basis functions. The representations for the top and bottom edges are similar to as those for the left and right edges.

Once all four edges are completed, the algorithm forms the union of the block's region of support $A^k(x,y)$ and the extension regions $B(x,y)$ to create the block's extended region of support $\tilde{A}^k(x,y)$ (step 98). The block's window function $W(x,y)$ is computed as the product of the window functions for each of its edges (step 100), which is given by:

$$W(x,y) = W_l(x,y)W_r(x,y)W_t(x,y)W_b(x,y) \quad (23)$$

Figure 11:
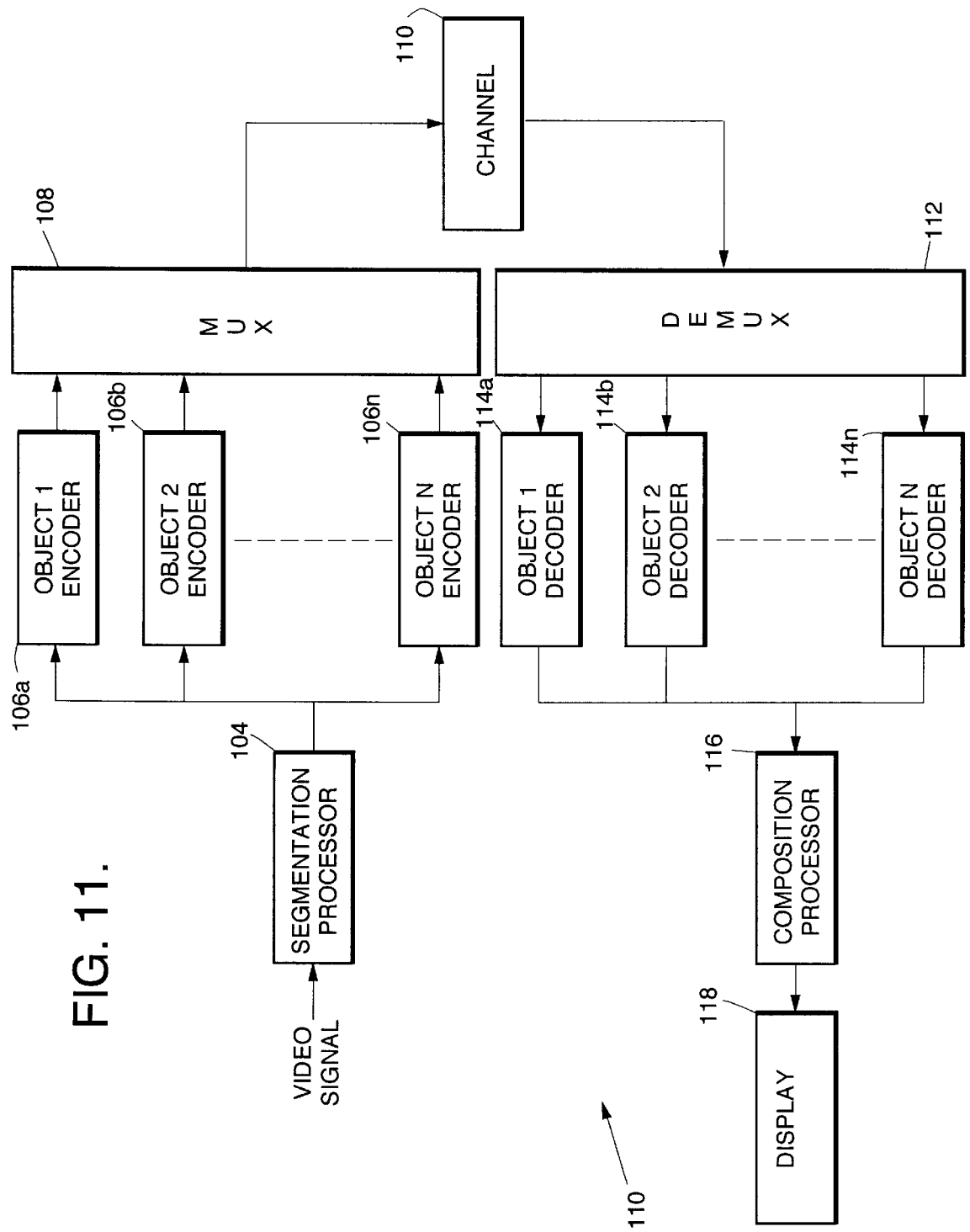
FIG. 11 is a block diagram of an object-based video coding system.

An object-based video system 102 is illustrated in FIGS. 11 and 12. A segmentation processor 104 segments each frame of a video signal to separate it into its constituent objects; foreground, background, text, graphics, etc, which are each defined by their boundary and their object blocks. The object's boundary and object blocks are passed to respective object encoders (106a, 106b, . . . , 106n) that encode the object using LOTs of the type described in equation 16 and the boundary. A multiplexer (MUX) 108 multiplexes the encoded data from the different objects into a single bitstream that is transmitted over a channel 110.

At the decoder, a demultiplexer (DEMUX) 112 demultiplexes the bitstream into the different objects. A plurality of object decoders (114a, 114b, . . . , 114n) perform an inverse LOT of the type described in equation 17 on the data to reconstruct the different objects. A composition processor 116 creates a composition of the reconstructed objects to generate the reconstructed image, which can then be viewed on a video display 118, stored in memory, or transmitted for further processing.

As shown in FIG. 12, each object encoder (106a, 106b, . . . , 106n) includes a processor 120 that shape codes the boundary (step 122) using, for example, chain codes. In a video signal, most objects will typically exhibit only minor changes from frame-to-frame. This high degree of correlation can be exploited to reduce the overall bit rate by predicting what the object's pixel values will be, subtracting the prediction from the actual object to form a residual object, and encoding the residual object (step 124). The residual object is encoded using Applicant's LOT algorithm described previously. Before the object can be encoded, its frame-to-frame motion must be compensated for (step 126). Block motion compensation is well known in the art and produces a set of motion vectors that are multiplexed into the bitstream. Because motion compensation does not handle rotation very well, the signal is typically resynched every 5–10 frames by coding the object data. The processor allocates bits (step 128) to code the shape, motion vectors, and transform coefficients in accordance with an optimization routine that will minimize the distortion and visual artifacts in the reconstructed image. The object decoders perform the inverse process to reconstruct each object.

Object-based coding provides the user with a great deal of flexibility. The default condition is typically to segment each frame into all of its objects, encode/decode each of the objects, and then form a composite reconstructed image. However, the system can be configured to completely drop certain objects or transmit them more infrequently, and to enhance, zoom or scale a specific object among many possible processing functions. This flexibility not only enhances the system's performance seen by the user but also reduces the channel capacity required to transmit the signal.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of object-based coding digital images, comprising:
   subdividing a digital image into a plurality of contiguous blocks, each said block having a region of support that is coextensive with its boundary;
   segmenting the digital image into a plurality of objects and their boundaries, at least one said object comprising a plurality of said contiguous blocks that define a rectangular region and also comprising first, second and third said contiguous blocks that define an L-shaped region, said first and second blocks and said first and third blocks sharing first and second interior edges, respectively, that meet at an exterior and concave corner of the object;

generating lapped orthogonal basis functions for the blocks in said rectangular and L-shaped regions, said basis functions in said L-shaped region being generated in part by, a) extending said first and second and said first and third blocks' regions of support to form respective extended regions of support that overlap in first and second overlapping regions that are symmetrical about said first and second interior edges, respectively, and taper between respective pairs of extension edges to said corner with a slope having magnitude $\delta/\epsilon$, where $\epsilon$ and $\delta$ are, respectively, the amounts of overlap between the blocks in the first and second overlapping regions and have non-zero values;

b) defining respective sets of orthogonal basis functions for said first, second, and third blocks on their extended regions of support; and c) multiplying the blocks' orthogonal basis functions by respective window functions over their extended regions of support to generate the lapped orthogonal basis functions, said window functions satisfying a set of conditions that maintain the orthogonality of the blocks' orthogonal basis functions over the extended regions of support including, each said window function (a) having a value of one in its block excluding the overlapping regions, (b) having a value of zero outside the block and its extended region of support, and (c) having values that taper from one along the extension edge in the block to zero along the extension edge in the adjacent block, and said pairs of window functions in the overlapping regions having values that (d) are symmetric with each other about the interior edge, and (e) preserve the energy of the lapped orthogonal basis functions in the overlapping regions;

coding the object's boundary to produce a set of boundary coefficients;

performing a two-dimensional transform on the blocks in said rectangular and L-shaped regions using their lapped orthogonal basis functions to produce a set of transform coefficients for each said object in the image; and quantizing the boundary and transform coefficients, each said object being reconstructable with a quantization error from its quantized boundary and transform coefficients.

2. The method of claim 1, wherein the blocks' extended regions of support are formed so that said object is completely defined by a combination of rectangular and L-shaped regions and can be reconstructed without artifacts other than said quantization error using only the transform coefficients associated with blocks in said rectangular and L-shaped regions within the object.

3. The method of claim 1, wherein the amounts of overlap $\delta$ and $\epsilon$ are, respectively, less than the height ($B_H$) and width ($B_W$) of the blocks so that said first overlapping region has a first rectangular portion remote from said corner that has a width of $2\epsilon$ and a height of $B_H$ minus $\delta$ and a first tapered portion that tapers from a width of $2\epsilon$ to zero at the corner and said second overlapping region has a second rectangular portion remote from said corner that has a height of $2\delta$ and a width of $B_W$ minus $\epsilon$ and a tapered portion that tapers from a height of $2\delta$ to zero at the corner.

4. The method of claim 3, wherein said blocks have equal height and width and said amounts of overlap $\delta$ and $\epsilon$ have values between twenty-five and seventy-five percent of said height and width.

5. The method of claim 1, wherein the sets of orthogonal basis functions $\hat{f}_{i,j}(x,y)$ on the extended regions of support are defined by first defining sets of orthogonal basis functions $f_{i,j}(x,y)$ on the respective blocks and then extending those basis functions into the blocks' extended regions of support so that the basis functions maintain their orthogonality.

6. The method of claim 5, wherein said basis functions are extended using an odd/even extension.

7. The method of claim 1, wherein said tapered window functions follow sinusoidal curves in said overlapping regions that taper from one to zero, said sinusoidal curves from adjacent blocks having sine/cosine symmetry in their overlapping regions such that the sum of the squares of the window functions equals one, which preserves the energy in the overlapping regions and maintains the orthogonality of the lapped orthogonal basis functions.

8. The method of claim 7, wherein said first, second and third blocks' extended regions of support all overlap at said corner point, their window functions having values that preserve the energy at said corner point.

9. The method of claim 1, wherein said lapped orthogonal basis functions for the blocks in said rectangular regions and in said L-shaped regions adjacent said rectangular regions are generated by, d) extending the blocks' regions of support into the adjacent blocks in said object to form extended regions of support that overlap in rectangular overlapping regions between the blocks;

e) defining respective sets of orthogonal basis functions for the blocks on their extended regions of support; and f) multiplying the orthogonal basis functions by respective window functions over their extended regions of support to generate the lapped orthogonal basis functions, said window functions satisfying the same set of conditions as the window functions on the L-shaped region to maintain the orthogonality of the blocks' basis functions.

10. The method of claim 9, wherein said contiguous blocks have 8-way connected neighboring blocks in said image, said blocks' extended regions of support and window functions for both said rectangular and L-shaped regions being determined by:

creating a table that includes the extended regions of support and their window functions for each neighborhood permutation of an 8-way connected block;

assigning each said block a label according to which of its 8-way connected neighboring blocks are part of said object; and using said label to look up an extended region of support and window function from said table.

11. The method of claim 9, wherein said contiguous blocks have four edges, each said edge having 5-way connected neighboring blocks in said image, said blocks' extended regions of support and window functions being determined by:

creating a table that includes the extended regions of support and their window functions for each neighborhood permutation of a 5-way connected edge;

computing a window function for each of the block's four edges by, assigning each said block a label according to which of its 5-way connected neighboring blocks are part of said object;

classifying the 5-way connectivity as one of five connectivity classes including no extension, a rectangular extension, or upper L-shaped extension, a lower L-shaped extension, and a double L-shaped extension, and using said label to look up an extended region of support and window function from the table for said edge, forming a union of the extended regions of support for each of the block's four edges with its region of support to form said extended region of support; and computing the product of the window functions for the block's four edges to define its window function.

12. The method of claim 1, wherein the two-dimensional transform is the discrete cosine transform (DCT).

13. A method of object-based coding digital images, comprising:

subdividing a digital image into a plurality of contiguous blocks, each said block having left, right, top and bottom edges that are each connected to five neighboring blocks and having a region of support that is coextensive with its edges;

defining a set of orthogonal basis functions for each block over its region of support;

segmenting the digital image into a plurality of objects and their boundaries, at least one said object comprising a plurality of said contiguous blocks that define a rectangular region and also comprising first, second and third said contiguous blocks that define an L-shaped region and share a pair of interior edges that meet at an exterior and concave corner of the object;

providing a look-up table (LUT) that includes, for each of said left, right, top and bottom edges, the extension regions and window functions for a plurality of connectivity classes that are defined by which of the edge's neighboring blocks are part of the object, said connectivity classes including a) a null class in which the block adjacent the edge is not part of the object, said extension region being an empty set, b) a rectangular class in which the block adjacent the edge is part of the object and the edge is not one of the interior edges in said L-shaped region, said extension region extending an amount $\epsilon$ for left and right edges and $\delta$ for top and bottom edges past and parallel to said edge into said adjacent block, which has a complementary extension region that extends into said block by the same amount thereby forming a rectangular overlapping region around said edge, and c) a taper class in which the block adjacent the edge is part of the object and the edge is one of the interior edges in said L-shaped region, said extension region extending the amount $\epsilon$ for left and right edges and $\delta$ for top and bottom edges past said edge into said adjacent block and tapering with a slope having magnitude $\delta/\epsilon$ to the edge at the concave corner of the L-shaped region, said adjacent block having a complementary extension region that extends into said block by the same amount thereby forming a tapered overlapping region around said edge, each edge's window function (a) having a value of one in its block and the regions extending past the block's other three edges excluding the overlapping region, (b) having a value of zero past the edge excluding the extension region, and (c) having values that taper from one to zero across the overlapping region, the adjacent blocks' window functions that form the overlapping region around said edge having values that (d) are symmetric with each other about the edge, and (e) the sum of their squares equal one;

for each object, selecting a block that is part of the object;

for each of the block's left, right, top and bottom edges, determining which of the edge's five neighboring blocks are part of the object;

assigning the edge a label corresponding to one of the connectivity classes; and using said label to look up the extension region and window function from said LUT;

forming a union of the extension regions for each of the block's four edges with its region of support to form an extended region of support; and computing the product of the window functions for the block's four edges to define its window function;

extending each block's orthogonal basis functions over its extended region of support in a manner that maintains their orthogonality;

multiplying each block's orthogonal basis functions by its window function over its extended region of support to generate a set of lapped orthogonal basis functions, coding the object's boundary to produce a set of boundary coefficients;

performing a two-dimensional transform on the blocks in said rectangular and L-shaped regions using their lapped orthogonal basis functions to produce a set of transform coefficients for each said object in the image; and quantizing the boundary and transform coefficients, each said object being reconstructable with a quantization error from its quantized boundary and transform coefficients.

14. The method of claim 13, wherein said basis functions are extended using an odd/even extension.

15. The method of claim 13, wherein said window functions follow sinusoidal curves in said overlapping regions that taper from one to zero, said sinusoidal curves from adjacent blocks having sine/cosine symmetry in their overlapping regions such that the sum of the squares of the window functions equals one, which preserves the energy in the overlapping regions and maintains the orthogonality of the lapped orthogonal basis functions.

16. The method of claim 15, wherein said first, second, and third blocks' extended regions of support all overlap at said corner point, their window functions having values that preserve energy at said corner point.

17. The method of claim 13, wherein said taper class includes three sub-classes; an upper L-shaped extension, a lower L-shaped extension, and a upper and lower L-shaped extension.

18. In an image subdivided into contiguous blocks and segmented into objects that contain first, second and third blocks in an L-shaped region that share a pair of interior edges that meet at an exterior and concave corner of the object, each said block having a region of support that is coextensive with its boundary, a method of generating lapped orthogonal basis functions, comprising:

defining a set of orthogonal basis functions for each block over its region of support;

extending said first and second and said first and third blocks' regions of support to form respective extended regions of support that overlap in first and second overlapping regions that are symmetrical about the respective interior edges and taper between respective pairs of extension edges to said corner with a slope having magnitude $\delta/\epsilon$, where $\epsilon$ and $\delta$ are, respectively, the amounts of overlap between the blocks in the first and second overlapping regions and have non-zero values;

extending the first, second, and third blocks' sets of orthogonal basis functions over their extended regions of support; and multiplying the blocks' extended orthogonal basis functions by respective window functions over their extended regions of support to generate the lapped orthogonal basis functions, said window functions satisfying a set of conditions that maintain the orthogonality of the blocks' orthogonal basis functions over the extended regions of support including, each said window function (a) having a value of one in its block excluding the overlapping regions, (b) having a value of zero outside the block and its extended region of support, and (c) having values that taper from one along the extension edge in the block to zero along the extension edge in the adjacent block, and said pairs of window functions in the overlapping regions having values that (d) are symmetric with each other about the interior edge, and (e) preserve the energy of the lapped orthogonal basis functions in the overlapping regions.

19. The method of claim 18, wherein the amounts of overlap $\delta$ and $\epsilon$ are, respectively, less than the height ($B_H$) and width ($B_W$) of the blocks so that said first overlapping region has a first rectangular portion remote from said corner that has a width of $2\epsilon$ and a height of $B_H$ minus $\delta$ and a first tapered portion that tapers from a width of $2\epsilon$ to zero at the corner and said second overlapping region has a second rectangular portion remote from said corner that has a height of $2\delta$ and a width of $B_W$ minus $\epsilon$ and a tapered portion that tapers from a height of $2\delta$ to zero at the corner.

20. The method of claim 19, wherein said blocks have equal height and width and said amounts of overlap $\delta$ and $\epsilon$ have values between twenty-five and seventy-five percent of said height and width.

21. The method of claim 18, wherein said basis functions are extended using an odd/even extension.

22. The method of claim 18, wherein said window functions follow sinusoidal curves in said overlapping regions that taper from one to zero, said sinusoidal curves from adjacent blocks having sine/cosine symmetry in their overlapping regions such that the sum of the squares of the window functions equals one, which preserves the energy in the overlapping regions and maintains the orthogonality of the lapped orthogonal basis functions.

23. The method of claim 22, wherein said first, second third blocks' extended regions of support all overlap at said corner point, their window functions having values that preserve the energy at said corner point.

* * * * *